United States Patent [19]

Desouches et al.

[11] 3,992,213

[45] Nov. 16, 1976

[54] HETEROGENEOUS REFRACTORY COMPOUNDS

[75] Inventors: Maurice M. Desouches, Avignon; Alain Le Sech, Entraigues, both of France

[73] Assignee: L-Electro-Refractaire, France

[22] Filed: June 21, 1974

[21] Appl. No.: 481,812

Related U.S. Application Data

[63] Continuation of Ser. No. 215,649, Jan. 5, 1972, abandoned.

[30] Foreign Application Priority Data

Jan. 8, 1971 France .............................. 71.00529

[52] U.S. Cl. ................................. 106/57; 106/65
[51] Int. Cl.² ......................................... C04B 35/48
[58] Field of Search ....................................... 106/57

[56] References Cited
UNITED STATES PATENTS 3,025,175  3/1962  Alred .................................. 106/57

*Primary Examiner*—J. Poer
*Attorney, Agent, or Firm*—Watson, Cole, Grindle & Watson

[57] ABSTRACT

The invention relates to dry heterogeneous refractory compositions comprising 90 to 30% by weight of a chamotte or grog and 10 to 70% by weight of a fine part comprising from 0 to 70% of weight of corundum or alumina and from 30 to 100% by weight of a substance comprising at least 70% by weight of zirconia, the said fine part having a silica content of less than 30% of its zirconia content, the percentages by weight of chamotte and of the fine part being stated with reference to the total weight of these two constituents, and the composition of the fine part being adapted to the chamotte so that the final material possesses in use a homogeneous resistance to chemical corrosion and to mechanical wear. These compositions are useful for the preparation of agglomerated refractory articles and of unshaped refractory products.

1 Claim, No Drawings

HETEROGENEOUS REFRACTORY COMPOUNDS

This a continuation of copending application Ser. No. 215,649, filed Jan. 5, 1972, now abandoned.

The invention relates to multiple-purpose heterogeneous refractory compositions.

The glass making industry generally uses, in order to construct its furnaces, electrically melted refractory products of high purity which are extremely strong and do not give rise to defects in production. These products are worked at a very high temperature so as not to undergo any fresh alteration in service.

However, in some cases it is necessary to use other refractory materials, either unshaped for making cold or hot joints or repairs in situ, or else shaped into actual shaped elements or monolithic furnace sections, raw or fired.

The unshaped refractory materials and the agglomerates which are available for this purpose are not always entirely suitable. These materials generally consist of a chamotte or grog (compact, relatively coarse grains) and of a fine part intended to form the bonds between the grains of the chamotte. When these materials are heated the fine part undergoes a fritting in situ and formation of sintering bridges between the grains of the chamotte occurs. The refractory material undergoes a degree of shrinkage as a result of this sintering, but the said shrinkage is insufficient to fill the totality of the pores or voids between the grains, so that the refractory material assumes the form of grains embedded in a porous shard. In use the refractory material obtained in this way wears irregularly in contact with corrosive media or by erosion, since the shard becomes corroded or worn more rapidly than the grains owing to its porous nature. This results in grains becoming detached from the refractory material, and therefore ceasing to contribute to its corrosion resistance and furthermore contaminating the production (these defects are called "stones" in the glass making industry).

In the past various solutions have been proposed to overcome these disadvantages. Thus attempts have been made to prevent the penetration of the corrosive medium by closing the pores of the product:

— either by manufacturing a homogeneous refractory material by sintering extremely fine powder, as described in French Patent Specification No. 1 578 404. The refractory material thus obtained has a very low porosity and therefore possesses excellent resistance to corrosion, but nevertheless it has the serious disadvantage of having a low strength at break;

— or by closing the pores by a vitreous phase, as described in French Patent Specification No. 1,326,552. According to this Patent, fluxes or catalysts are added to the refractory composition in order to develop a vitreous phase during the firing of the product. However, owing to the fusibility of the vitreous phase obtained, this method involves a serious reduction in the properties of mechanical strength and corrosion resistance at high temperatures.

Attempts have likewise been made to increase the cohesion between the grains by chemical reaction of different elements forming a fresh phase. Thus the homogeneous and heterogeneous refractory materials according to French Patents Nos. 1,159,278 and 1,314,997 make use of a reaction at high temperature between zircon ($SiO_4Zr$) and corundum ($Al_2O_3$) in order to form mullite ($3\ Al_2O_3, 2SiO_2$) and zirconia ($ZrO_2$). The presence of a flux, which may be added, further introduces a vitreous phase. As in the previous Case, the presence of mullite and of the vitreous phase reduce the high temperature properties of the products obtained.

The subject of this invention is heterogeneous refractory compositions which can be used in the form of agglomerated products or of unshaped products which are free from the above mentioned disadvantages. The refractory compositions of the invention possess excellent stability and their resistance to attack by the corrosive substances of the glass making industry and of the iron and steel industry, both in the molten state and in the vapour state, can be made homogeneous so that their wearing face is smooth and regular and that therefore they do not produce inclusions in the product treated. Furthermore, the compositions of the invention have a relatively low cost.

The invention relates to heterogeneous refractory compositions comprising 90 to 30% by weight of a chamotte or grog with a granulometry greater than $100\mu$ and 10 to 70% by weight of a fine part intended to form a porous shard embedding the relatively coarse grains of the chamotte, having a granulometry smaller than $100\mu$, preferably smaller than $40\mu$, and comprising from 0 to 70% by weight of corundum or alumina and from 30 to 100% by weight of a substance or mixture of substances comprising at least 70% by weight of zirconia, the percentages by weight of chamotte and of fine part being stated with reference to the total weight of these two constituents.

The fine part is constituted, as stated hereinbefore, by corundum or alumina, if any, and a substance with a high zirconia content. The corundum may be obtained for example by grinding electrically melted products or from fired alumina. The granulometry of the corundum or alumina used must be smaller than $100\mu$, preferably smaller than $40\mu$. The substance (or mixture of substances) with a high zirconia content may be natural or synthetic. Its granulometry must be smaller than $100\mu$, preferably smaller than $40\mu$. The chemical and crystallographic nature of the substance forming the porous shard must be such that this substance has a lower solubility in the corrosive medium than that of the grains of the chamotte, so as to counterbalance the detrimental influence of the porosity of the shard and to obtain a smooth corrosion surface. To this end the fine part of the omposition must contain the less possible amount of silica and fluxing substances, because silica on being heated associates with alumina and any fluxing impurities which may be present to form a vitreous phase and mullite which facilitate corrosion. More particularly, mullite is transformed into nepheline and kaliophilite, which are intermediate dissolution substances. A little silica will however generally be present in the compositions of the invention as impurities originating from the raw materials used or derived from one of the constituents (for example, zircon) of the mixture of substances with a high zirconia content. In any case the content of silica in the fine part must be below 30% of the zirconia content.

The chamotte or grog or aggregate is chosen as a function of the particular characteristics which it is desired to give to the final refractory material. If a product which has high corrosion resistance is desired, then the chamotte chosen will be for example grains of electro-fused or sintered or naturally-occurring dense products belonging to the alumina silica zirconia diagram (including boundaries). If a product having a good resistance to thermic variations and to corrosion is desired, then it will be possible to use as chamotte, for example, tabular alumina, fibrolite or fired kyanite. If a product having insulating properties in addition to corrosion resistance is desired, then the chamotte may be constituted by hollow refractory spheres. Of course, other chamottes than those specifically mentioned may be used, and the examples given are not limitative.

It will likewise be appropriate to choose the percentages and the granulometry, whilst respecting the limits indicated hereinbefore of the chamotte and of the fine part as a function of the form in which it is proposed to use the composition, and of its process of manufacture, as is obvious to the expert. Thus if the composition is intended to be used in the form of a grout, the chamotte selected will have grains smaller than 0.5 mm, and the composition will include a high percentage of fine part. If it is desired to prepare a mixture for super-compressed pressure moulding, then a small percentage of fine part will be used, whereas by contrast the preparation of a mixture for slip casting will necessitate a high percentage of fine part.

In order to obtain the advantages of the present invention it is necessary for the corrosion resistance of the porous shard derived from the fine part to be adjusted to the corrosion resistance of the grains of the chamotte. This is effected by suitably regulating the ratio of the constituents of the fine part. Generally speaking, in order to increase the resistance of the shard to chemical corrosion at high temperatures, the zirconia content of the fine part will be increased. On the other hand, when the corrosion process is associated with abrasion, the corundum or alumine content of the fine part will be increased compared to the zirconia content, and in the case the corundum or alumina content may be higher than the zirconia content. Likewise for a given composition of the fine part, the resulting strength of the porous shard may vary appreciably according to the conditions of pressing and firing of the material used, the porosity of the final material being a function of these conditions. It is therefore impossible, having regard to the large number of factors to be taken into consideraton, to give precise instructions for adjusting the resistances to corrosion of the shard and of the chamotte. However, in all cases it will be within the competence of the expert to adjust the corrosion resistances of the chamotte and of the porous shard.

Some compositions of fine parts which may be suitable for various chamottes for certain uses are given hereinbelow by way of indication.

| Composition of the fine part in % | | | Nature of the chamotte | Purpose |
|---|---|---|---|---|
| $ZrO_2$ | $Al_2O_3$ | $SiO_2$max. | E.R. 1711* | Corrosion by sodocalcic glass at 1500° C |
| 100–80 | 0–20 | 7 | | |
| 80–65 | 20–35 | 5 | Electrically fused or sintered corundum | |
| 65–50 | 35–50 | 5 | Synthetic mullite | |
| 60–45 | 40–55 | 5 | Electrically fused or sintered corundum | Corrosion by sodocalcic glass at 1200° C |
| 45–30 | 55–70 | 5 | Synthetic mullite | |
| 65–40 | 10–30 | 10 | Fibrolite or fired Kyanite | Between 1350 and 1550° C |
| 40–25 | 30–60 | 12 | | Between 1000 and 1350° C Corrosion by |
| 100–80 | 0–20 | 10 | Zircon | borosilicates and other special glasses |

*Electrically melted product manufactured by the applicant company and containing, by weight, 41% $ZrO_2$; 12.5% of $SiO_2$; 0.8% of $Na_2O$, and $Al_2O_3$ for the balance.

The compositions according to the invention can be moulded by the classic methods used in the refractory industry, and also by slip casting or isostatic pressure moulding. In order to facilitate the handling of the product after shaping, there should be added to the compositions of the invention an organic binder — e.g., a ligno-sulphonate, a polyethylene glycol, ethyl cellulose — or a mineral binder — e.g., refractory clay, bentonite — and also a deflocculant if the shaping is effected by slip casting. The mouldings thus obtained are dried and fired at a temperature above 1550° C. The firing period must be sufficiently long for the reactions in solid phase to take place. The porous shard after firing assumes the form of an assembly of crystals of zirconia and corundum, if any, with a very small percentage of vitreous phase and mullite favouring the direct bonding between the zirconia and the corundum or the alumina.

Instead of the organic or mineral binder, it is possible to introduce into the composition a chemical binder (alumina phosphate, phosphoric acid, etc.). The elements obtained with such a mixture do not require firing after shaping. These elements will undergo firing in situ when the refractory construction is heated, or progressively in contact with the products treated (for example, glass).

The compositions of the invention, with the above mentioned binders added to them, may also be distributed commercially in the form of unshaped products, for example in the form of plastics masses, puddles, grouts, cements, etc.. The expert will easily be able to formulate such products from the compositions according to the invention. These products are shaped or applied directly to the place of use by tamping, ramming, coating or pouring. After application or shaping, the lining or the article is allowed to dry so as to eliminate the moisture. The firing of the product takes place when the refractory construction is heated. The hot face, as it sinters in contact with the flames or with the products treated, resists corrosion, whereas the cold face remains unsintered and constitutes a thermic insulation.

In some cases it may be advantageous to add to the compositions products which promote sintering such as $TiO_2$, $AlF_3$, $CaF_2$, etc..

The invention will now be illustrated by the following non-limitative examples:

EXAMPLE 1

A joining grout is made up by mixing:

| | |
|---|---|
| electrically fused alumina, granulometry from 0.1 to 0.5 mm | 50% by weight |
| ground fired alumina, granulometry smaller than 40μ | 30% by weight |
| E.R. S 157, granulometry smaller than 40μ(an artificial product manufactured by the applicant company and obtained by reducing $SiO_2$ in a mixture of zircon and | |

-continued

| alumina sand; this product contains on average 80% ZrO$_2$, 15% of Al$_2$O$_3$ and 5% of SiO$_2$) | 20% weight |
|---|---|

The binder is constituted by a 50% phosphoric acid solution added at the rate of 7 liters per 100 kg of grout.

This grout is used for preventing infiltrations of glass behind the blocks of electrically fused material of a basin furnace. The grout is not subject to thermic cycling and at this level the glass has a temperature of 1200° C.

After firing at 1200° C, the product has a density of 2.70 and an open porosity of 25%; its overall composition was by weight Al$_2$O$_3$ : 83%; ZrO$_2$ : 12%, SiO$_2$ : 1%.

The applicant company studied this product by comparing it with the "E.R. 67" grout which it manufactures and which contains by weight 85% of electrically fused alumina smaller than 250$\mu$, 12% of kaolin, and 3% of organic binder.

When fired under the same conditions, this product had a density of 2.40 and porosity of 25%.

A corrosion test of the "finger test" type was performed on these two products at 1300° C for 5 hours.

The product according to the invention exhibits greatly superior strength with smooth wearing faces.

EXAMPLE 2

The following composition was prepared for making agglomerates for the glass making industry:

| fired kyanite, granulometry 5 to 2 mm | : 30% by weight |
|---|---|
| fired kyanite, granulometry from 2 to 0.5 mm | : 20% by weight |
| fired, kyanite, granulometry ≤ 0.5 mm | : 10% by weight |
| alumina, granulometry smaller than 40$\mu$ | : 10% by weight |
| E.R.S. 157, granulometry smaller than 40$\mu$ | : 30% by weight |

This mixture, with a green binder of the lignosulphonate type added at the rate of 3% by weight was pressure moulded at 800 kg/cm$^2$. The bricks obtained were fired at 1550° C.

The densities obtained were 2.95 green and 2.86 after firing with an open porosity of 18%.

The overall analysis of the product was as follows:

| Al$_2$O$_3$ | : | 53% weight |
|---|---|---|
| ZrO$_2$ | : | 24% weight |
| SiO$_2$ | : | 23% weight. |

The non-crystalline silica represented only 3% of the weight.

This method was compared with a commercial product based on agglomerated fired kyanite with 10% of refractory clay, fired at the same temperature.

This product possessed the following characteristics: density 2.42; open porosity 18%.

A dynamic corrosion test was performed in the presence of a sodocalcic glass at 1500° C for 10 hours.

If the index of resistance to corrosion is 100 for the product conforming to the invention, then the classic fired kyanite product has a resistance of only 58. Furthermore, the product of the invention possesses as good a strength at break as the prior art product.

Moreover, if the product previously quoted, instead of being shaped by pressure moulding, is obtained by slip casting, with a density of 2.80 and an open porosity of 20%, then the index of resistance to corrosion obtained is 110.

In both cases the wearing faces are smooth.

EXAMPLE 3

The following composition for agglomerates is prepared:

| electrically fused grains of E.R.1711 granulometry from 5 to 2 mm | : 30% by weight |
|---|---|
| electrically fused grains of E.R.1711 granulometry from 2 to 0.5 mm | : 25% by weight |

| electrically fused grains of E.R.1711 granulometry less < than 0.5 mm | : 20% by weight |
|---|---|
| E.R.S. 157 granulometry smaller than 40 $\mu$ | : 25% by weight |

This mixture, with a green binder of the ligosulphonate type added at the rate of 3% on the weight, and pressure moulded at 800 kg/cm$^2$, then fired at a temperature of 1600° C, yielded bricks with the following characteristics: density 3.45; open porosity 18%.

A brick of pure E.R.1711, produced under the same conditions, has a density of 3.32 and an open porosity of 17%.

Both the refractories were subjected to a dynamic corrosion test with sodocalcic glass at 1500° C for 24 hours.

The following indices of resistance to corrosion were obtained:

| Pure agglomerated E.R.1711 | : | 100 |
|---|---|---|
| Product according to the invention | : | 115. |

The former has a pitted corrosion face, while the latter is perfectly smooth.

EXAMPLE 4

The following composition was prepared for manufacturing agglomerated parts such as punches, cups, rotors and tubes, used in glass making furnaces:

| tabular alumina, granulometry from 0.5 to 2 mm | : 20% weight |
|---|---|
| tabular alumina, granulometry from 0.5 to 0.2 mm | : 40% weight |
| alumina, granulometry smaller than 100 $\mu$ | : 10% weight |
| E.R.S 157, granulometry smaller than 40 $\mu$ | : 30% by weight. |

This mixture, with ethyl-cellulose added at the rate of 1% as a green binder together with 4% of pure water, when rammed into the moulds with a pneumatic rammer, then fired above 1550° C, yielded an agglomerate with the following characteristics:

| green density | : | 3.30 |
|---|---|---|
| after firing | : | 3.20 |
| open porosity | : | 18% |

Overall analysis of the product obtained: $Al_2O_3 = 74\%$; $ZrO_2 = 24\%$; $SiO_2 = 2\%$.

The elements obtained, which are subject to thermic shock and to corrosion, wear in a highly uniform manner, have a good strength at break and do not give rise to defects in the glass.

EXAMPLE 5

A puddle cement of the following composition by weight was prepared:

| | |
|---|---|
| tabular alumina, granulometry from 2 to 0.5 mm | : 50% weight |
| alumina, granulometry smaller than 40$\mu$ | : 30% weight |
| E.R. S 157, granulometry smaller than 40$\mu$ | : 20% weight. |

To this composition a binder was added giving the whole a hydraulic set, such as a calcium aluminate or a phosphoric binder. The puddle cement obtained is useful for carrying out repairs either hot or cold in a glass making furnace. A part made with this puddle cement is dried slowly then fired at 1200° C. It has good thermic breaking strength and corrosion resistance and possesses the following characteristics:

Density: 2.95 green; 2.85 after firing
Open porosity: 21%

Overall analysis of the product: $Al_2O_3 = 83\%$; $ZrO_2 = 16\%$; $SiO_2 = 1\%$

We claim:

1. An unfired heterogeneous refractory composition useful for producing ultimate refractory products having a homogeneous resistance to corrosion from the corrosive medium present in glass furnaces, said composition consisting essentially of:

90 to 30% by weight of a grog consisting essentially of a refractory material selected from the group consisting of alumina and substances consisting essentially of at least two of silica, alumina and zirconia, said grog having a granulometry greater than 100 microns; and 10 to 70% by weight of a fine part consisting of particles having a granulometry of less than 40 microns, the percentages by weight of grog and of fine part being given with respect to the total weight of these two constituents, said particles consisting essentially of from 0 to 70% by weight of alumina and from 30 to 100% by weight of a substance consisting of at least 70% by weight of zirconia, said particles having a silica content which is less than 30% by weight of their zirconia content, said particles having a resistance to said corrosive medium which is higher than that of said grog material.

* * * * *